United States Patent [19]

Ellinor

[11] 4,229,243

[45] Oct. 21, 1980

[54] RESILIENTLY STABILIZED WEB MOVEMENT FOR HONEYCOMB MACHINE

[76] Inventor: Daniel H. Ellinor, 6820 Briar Cove, Dallas, Tex. 75240

[21] Appl. No.: 20,759

[22] Filed: Mar. 15, 1979

[51] Int. Cl.$^2$ .............................................. B32B 31/00

[52] U.S. Cl. .................................... 156/269; 156/291; 156/510; 156/549

[58] Field of Search ............... 156/197, 291, 269, 443, 156/510, 578, 549, 548

[56] References Cited

U.S. PATENT DOCUMENTS

| | | | |
|---|---|---|---|
| 2,610,934 | 9/1952 | Steele | 156/197 |
| 2,734,843 | 2/1956 | Steele | 156/197 |
| 3,035,952 | 5/1962 | Gwynne | 156/512 |
| 3,184,365 | 5/1965 | Rule | 156/548 |
| 3,257,253 | 6/1966 | Hoyt | 156/197 |
| 3,307,440 | 3/1967 | Hoyt | 83/170 |
| 3,413,177 | 11/1968 | Hoyt | 156/512 |
| 3,416,983 | 12/1968 | Steele | 156/197 |
| 3,458,385 | 7/1969 | Bova | 156/197 |
| 3,518,151 | 6/1970 | Ellinor | 156/512 |
| 3,607,577 | 9/1971 | Geschwender | 156/548 |
| 3,630,801 | 12/1971 | Booth | 156/197 |
| 3,660,195 | 5/1972 | Hoyt | 156/197 |
| 3,713,954 | 1/1973 | Clark | 156/548 |
| 3,887,419 | 6/1975 | Geschwender | 156/197 |

*Primary Examiner*—Douglas J. Drummond
*Attorney, Agent, or Firm*—Dennis T. Griggs

[57] ABSTRACT

An array of dancer rollers are resiliently biased for engaging a plurality of webs in a take-up zone of a honeycomb machine. The dancer rollers engage each web and thrust it out of its plane of advance to maintain the webs under continuous tension loading as they are alternately advanced and halted during successive feeding and cutting cycles, respectively. A pair of index rollers engage the webs, pull them from supply rolls and feed them to a cyclic cutter in response to rotation of the index rollers. In this arrangement, the continuous drive rollers used in conventional web movement arrangements are eliminated with the webs being pulled from the supply roll intermittently and according to need by the index rollers. The dancer roller array stabilizes movement of the webs through the take-up zone by maintaining the webs under tension when the index rollers are stoped during the cutting cycle even though play-out of each web from its supply roll continues because of the inertia associated with the rotating mass of the supply roll. The magnitude of the thrusting force applied by the dancer rollers at each successive station is preferably less than the magnitude of the thrusting force applied at the preceding station. This graduated, yieldable thrusting arrangement eliminates backlash and rambling of the webs at the supply rolls and permits the index rollers to pull the webs from the supply rolls intermittently without slippage of the webs relative to the index rollers and without risk of exceeding the burst strength of the webs.

3 Claims, 3 Drawing Figures

RESILIENTLY STABILIZED WEB MOVEMENT FOR HONEYCOMB MACHINE

BACKGROUND OF THE INVENTION

1. Field of the Invention

The claimed invention relates generally to web transport apparatus, and more particularly to the structure of a honeycomb machine in which web material is fed incrementally to a cyclic cutter through a resiliently stabilized web movement.

2. Description of the Prior Art

Cellular cores, commonly known as honeycomb stock, have been developed over recent years to supply the need for an inexpensive construction element having a high strength-to-weight ratio. These cellular cores are typically sandwiched between thin panels of sheet metal, or the like, to provide building components such as walls, partitions, doors, container panels, pallets and the like. These cellular cores are formed typically of sheet material such as paper, sheet metal, foil, and plastic.

The expanded cellular core preferably has the general shape and appearance of a honeycomb structure and therefore is commonly referred to as honeycomb. The unexpanded honeycomb core stock is fabricated by applying parallel but non-registering narrow strips of adhesive to adjacent superimposed webs. When the adhesive is set, the webs of the honeycomb stock are expanded to form the cellular structure. Facing webs or backing sheets may be adhered on opposite sides of the expanded core structure which produces a low density structural element having great strength and resistance to loads applied normal to the facing webs.

According to the construction and operation of continuous honeycomb machines, unexpanded honeycomb stock is produced by continuously feeding a plurality of webs from a corresponding number of supply rolls which are journaled in bearings for free rotation about horizontal axes in response to a pulling force. During the continuous feeding, spaced parallel, longitudinal lines of adhesive are applied to opposite sides of one of the webs in non-registering relationship to one another. The continuous feed of both webs from supply rolls is carried out by constant feed drive rolls which engage and continuously pull the webs from the supply rolls through the machine. Continuously driven feed rolls are provided to move the webs vertically downward in mutually superimposed and laminated condition toward a cutting zone, and a reciprocating cutter is provided to cut successive strips of the laminated webs of desired thickness. The cut strips are continuously packed into a packing throat and are laminated together to make a continuous length of expanded honeycomb material. In the vertical space between the cutter and the constantly driven feed rolls there is a take-up mechanism for accumulating excess web material which is delivered during the time that the reciprocating cutter is cutting.

The foregoing continuous feed arrangement and variations of it are commonly used for producing continuous honeycomb core. However, the efficiency and success of such conventional honeycomb machines which utilize a continuous web movement have been limited by certain technical problems associated with coordinating the continuous movement of a plurality of webs at a constant feed rate to an intermittently operating knife cutter. The construction of the constant drive apparatus is based upon the assumption that the paper conveyed by the constant drive apparatus is relatively inelastic and has substantially umiform properties along its length. However, in practice, a web of paper of the type typically used to make honeycomb stock has certain elastic properties which vary with temperature and humidity which allow it to stretch slightly under tension, as the ambient humidity and temperature varies. Additionally, variations of the winding tension applied to the webs as they are wound on their cores can cause variations in the relative weight of two supply rolls having the same diameter, thereby presenting unequal inertia loads to the constant drive apparatus.

Variations in the advancement of one web relative to the other may cause non-symmetrical cell formation which can lead to a quality control rejection of the core stock. Thus the web movement must be constantly observed by a trained operator to detect such variations and take corrective steps by adjusting the continuous drive apparatus from time-to-time as necessary. Because of the subtle nature of the variations of relative web movement and because of the nonlinear dynamic effects encountered in adjusting the feed of one web relative to the other, the operation of such a machine necessarily results in part from subjective determinations made by the operator and depends upon his skill and ability to make the necessary adjustment to the constant speed drive mechanism. Thus the quality of the core stock production in such a machine is directly dependent upon the experience level and skill of the operator.

The quality of the core stock is further limited by the slight inaccuracies in the driven rolls and the slight differentials in their surface speeds. It has been found that if more than a single pair of positive drive rolls are used, then there must be the utmost accuracy in synchronizing the surface speeds of such pairs of rolls with the result being to greatly increase the cost of manufacture of the machine. Thus the driver rolls must be engineered with micrometric accuracy for faithful service. It will be appreciated that such inaccuracies will increase as the moving parts are subjected to wear and age, and further that the effects of such inaccuracies are magnified as the operating speed is increased.

An additional problem relating to the operation of continuous honeycomb machines is that each time the thickness of the honeycomb stock is changed, the timing gears must also be changed. This requires that a set of timing gears be maintained corresponding to each desired core thickness. It will be appreciated that this requirement directly increases the capital investment involved, labor cost and down time of the machine.

OBJECTS OF THE INVENTION

It is therefore the principal object of the present invention is to provide a web transport assembly which is capable of drawing a web from a supply roll and delivering it to a processing station solely by intermittent drive means and without reliance upon continuous drive rolls.

Another object of the invention is to provide a web movement for incrementally advancing a web from a supply roll through a take-up zone to a feed zone while simultaneously maintaining the web under tension in the take-up zone as movement of the web on the delivery end of the web is arrested and play-out movement of the web on the supply roll end continues.

Yet another object of the present invention is to provide a web movement for use in a honeycomb machine for intermittently advancing a length of web material from a supply roll to a feed zone of a cutting station in which the web is drawn from the supply roll and delivered to the feed zone incrementally without risk of exceeding the burst strength of the web as it is drawn from the supply roll.

Still another object of the present invention is the provision of a resiliently stabilized web movement which automatically dissipates wrinkles or transverse waves which may be propagated across the web as it is pulled through a take-up zone.

Another object of the present invention is the provision of a resiliently stabilized web transport apparatus which allows a single pair of index rollers to advance a plurality of webs from a corresponding number of supply rolls intermittently through a take-up zone without slippage of the webs relative to the index rolls, without risk of exceeding the burst strength of the webs, and without producing backlash at the supply rolls.

Yet another object of the present invention is the provision of a web movement in which tension is maintained in a web as it is moved through a take-up zone by the graduated application of yieldable thrusting forces as the web is alternately advanced and halted during successive feeding and processing cycles, respectively.

Still another object of the invention is the provision of a web movement for advancing a web from a supply roll through a take-up zone while automatically dissipating the build-up of transverse waves propagated across the web as it advances through the take-up zone in a manner which is independent of the rate of advance of the web through the take-up zone.

Another object of the invention is the provision of a web transport assembly which is capable of drawing a plurality of webs through a take-up zone while automatically compensating for the uneven advance of one web relative to the other in a manner that does not require operator assistance or observation.

Finally, an important object of the invention is the provision of a web transport assembly which is capable of drawing a plurality of webs through a take-up zone and delivering the webs to a feed zone by intermittent drive means and without reliance upon continuous drive rolls or timing gears whereby the thickness of the core stock produced by the machine may be increased or decreased without using a timing gear.

SUMMARY OF THE INVENTION

According to novel features of the present invention, the foregoing objects are achieved by an array of dancer rollers which are resiliently biased for engaging a length of web material at a plurality of stations in a take-up zone of a honeycomb machine. The dancer rollers engage the web and thrust it out of its plane of advance to maintain the web under continuous tension loading as the web is alternately advanced and halted during successive feeding and cutting cycles, respectively. A pair of index rollers engage the web, pull it from a supply roll and feed it to a cyclic cutter in response to rotation of the index rollers. In this arrangement, the continuous drive rollers used in conventional web movement arrangements are eliminated with the web being pulled from the supply roll intermittently and according to need by the index rollers. The dancer roller array stabilizes movement of the web through the take-up zone by maintaining the web under tension when the index rollers are stopped during the cutting cycle even though play-out of the web from the supply roll continues because of the inertia associated with its rotating mass. The magnitude of the thrusting force applied by the dancer rollers at each successive station is preferably less than the magnitude of the thrusting force applied at the preceding station. This graduated, yieldable thrusting arrangement eliminates backlash problems at the supply roll and permits the index rollers to pull the web from the supply roll intermittently without slippage of the web relative to the index rolls and without risk of exceeding the burst strength of the web.

In the preferred embodiment, the web transport assembly of the invention is incorporated in a honeycomb machine in which a pair of webs are pulled from a pair of supply rolls through a take-up zone and delivered to a cyclic cutter assembly for producing a continuous length of unexpanded honeycomb stock. The webs are fed in parallel relation into the take-up zone where they are engaged by guide rollers and separated whereby one of the webs may be moved across an adhesive applicator station for receiving non-registering stripes of adhesive on the opposite faces of the web. After passing through the adhesive applicator station, the webs are pressed together by a pair of index rollers which engage the superimposed webs, pull them from the supply rolls and feed the laminated combination into the cutting zone of the cyclical knife assembly. According to this arrangement, the index rollers are driven intermittently during successive feeding and cutting cycles, respectively, whereby the laminated webs are advanced incrementally into the cutting zone.

According to the invention in its broadest aspects, resilient means are mounted intermediate the supply rolls and the web drive apparatus for engaging the webs and thrusting them out of their planes of advance to maintain them under tension loading as they are alternately advanced and halted during the successive feeding and cutting cycles, respectively. The resilient means preferably comprises an array of dancer rollers for engaging the upper and lower webs at thrusting stations which are spaced relative to each other intermediate the supply rolls and the web pulling means. Each dancer roller is mounted on a frame for movement transverse to the direction of the web movement at the line of engagement of each dancer roller and web. Resilient means are coupled to each dancer roller for biasing each dancer roller into thrusting engagement with the web and for maintaining the web under tension as the web is alternately advanced and halted during the successive feeding and cutting cycles, respectively. Preferably, at least two dancer rollers engage each web with the magnitude of the thrusting force applied at each successive thrusting station in the direction of web movement through the take-up zone being less than the magnitude of the thrusting force applied at the preceding station.

According to a preferred embodiment, the webs are fed in parallel relation into the take-up zone and are tensioned simultaneously by a single dancer roller assembly which is biased to apply a thrusting force against the superposed webs in the direction of unwinding movement of the webs as they are played out from the supply rolls, thereby preventing backlash, and by a second dancer roller assembly applying a relatively smaller yieldable thrusting force against the superposed webs prior to being divided by a pair of guide rolls. After being divided to follow upper and lower paths, the upper and lower webs are separately engaged by third and fourth dancer roller assemblies, respectively, each being biased to apply a yieldable thrusting force against the upper and lower webs which is less than the magnitude of the thrusting force applied by the second dancer roller assembly. According to this arrangement, the tension loading applied to the upper and lower webs is applied gradually so that a relatively large pulling force may be applied to the webs to overcome the inertia of the supply rolls without exceeding the burst strength of the webs. This arrangement also permits the webs to be withdrawn and fed intermittently at a relatively fast rate without causing backlash or rambling movement of the webs at the supply rolls and without causing slippage of the index rollers relative to the webs as they are fed into the cutting zone. Applying the yieldable thrusting force to both of the webs as they enter the take-up zone assures that the webs will be withdrawn from the supply rolls at substantially the same rate, even though one roll may have a larger mass or diameter than the other. The differential tensioning arrangement of the superposed webs as they enter the take-up zone in combination with the graduated tension force applied to the webs individually after they are separated effectively dissipates the build up of wrinkles or transverse waves which sometimes are propagated across the webs.

These and other related objects and advantages of the present invention will become more apparent from the following specification, claims and appended drawings wherein:

DESCRIPTION OF THE PREFERRED EMBODIMENT

Figure 1:
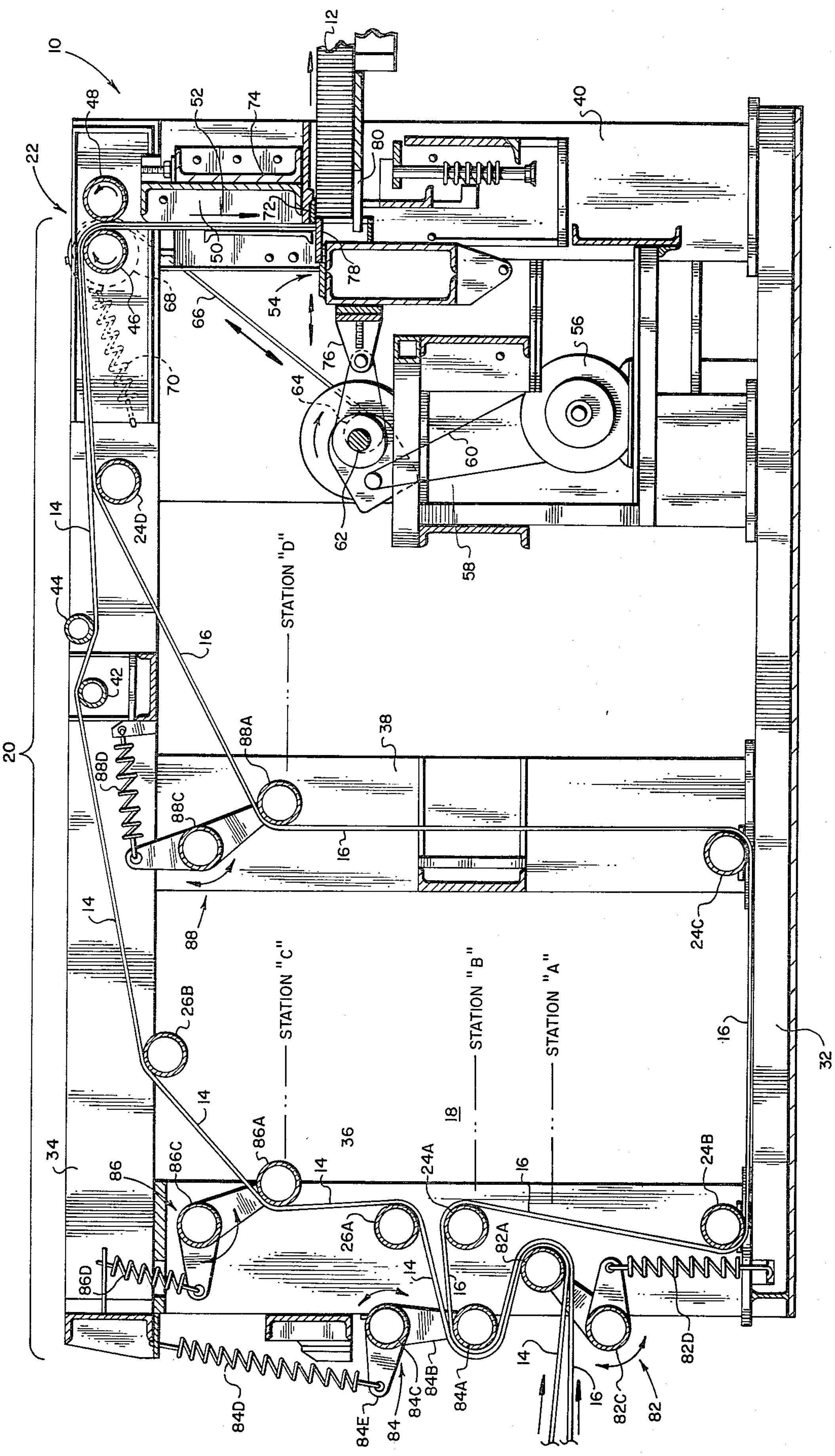
FIG. 1 is an elevation view, partly in section, of a honeycomb machine having a web transport assembly constructed according to the teachings of the invention.

In the description which follows, like parts are marked throughout the specification and drawings with the same reference numerals, respectively. The figures are not necessarily drawn to scale and in some instances portions have been exaggerated in order to more clearly depict certain features of the invention.

Referring now to FIG. 1, a honeycomb machine 10 for producing a continuous length of unexpanded honeycomb core stock 12 from a pair of webs 14, 16 is illustrated. The webs 14, 16 are drawn from separately mounted supply rolls (not illustrated) which are journaled in bearings for free rotation about horizontal axes in response to a pulling force. The supply rolls contain linerboard paper wound under tension to about fifty inches in diameter around a four inch core and therefore at all times represent a considerable amount of inertia. Because of this inertia, a rather large pulling force must be exerted to start play-out motion of the webs which motion tends to continue after the pulling force has been interrupted. The high start-up force required and the tendency to continue rotation give rise to problems involving slippage of the drive mechanism which pulls the webs through the machine and backlash at the supply rolls, respectively. If the starting force is applied too abruptly, there is a risk of rupturing the web if its burst strength is exceeded. These problems have been overcome in the prior art by pulling the webs very slowly at first and gradually building up the feed movement of the webs to a desired speed and then continuously driving the webs at that desired speed by a constant drive assembly. However, because of the technical problems associated with driving the webs through two separate paths at a constant rate of speed, the conventional constant drive web movement arrangement has not proven to be satisfactory in all cases, as discussed above.

In order to avoid the foregoing problems associated with a continuous drive arrangement, a resiliently stabilized web movement, indicated generally at 18, is provided for transporting the webs 14, 16 from the supply rolls through a take-up zone, indicated generally by the reference numeral 20, to a feed station 22.

The webs 14, 16 are guided along separate paths through the honeycomb machine 10 by a plurality of guide rolls 24A, 24B, 24C and 24D and 26A, 26B, respectively. The guide rolls 24A–D and 26A, B are not driven but are journaled in bearings 28, 30 (FIG. 2), respectively, for free rotation about horizontal axes.

The honeycomb machine 10 is incorporated in a frame which is reinforced at each corner by structural beams 32, 34. Columns 36, 38 and 40 on each side of the machine provide lateral support for the various upper and lower guide rolls. Rails and rail extensions (not shown) extend longitudinally along each side of the machine and tie bars (not shown) extend laterally across the frame assist in holding the columns in proper position according to conventional practice.

The two webs 14, 16 are drawn from a pair of supply rolls (not shown) which may be either mounted horizontally with respect to each other or vertically with respect to each other with their respective axes of rotation disposed in parallel relation. The purpose of the guide rolls 24A–D and 26A, B is to guide the webs 14, 16 along separate paths whereby one of the webs, in this case the web 14, can receive non-registering stripes of adhesive on its opposite sides prior to reaching the feed station 22. This is carried out, as shown in FIG. 1, by a pair of adhesive rollers 42, 44 of conventional construction which apply narrow stripes of adhesive in non-registering relation on opposite sides of the web 14 at a point where the web is not directly supported by any other roll in the system. The adhesive rollers 42, 44 are not positively driven and merely support the webs as the adhesive is applied.

After leaving the adhesive rollers, the top web 14 is fed to the nip of a pair of index rollers 46, 48 at the feed station 22. The superposed webs 14, 16 descend into a feed zone 50 as indicated by the arrow 52 toward a cyclical knife assembly 54. The index rollers 46, 48 are driven by the chain 66 to advance precisely the length of the web which it is desired to sever to form part of the honeycomb stock 12. The index rollers 46, 48 are driven clockwise and counterclockwise, respectively, and intermittently by a drive assembly which includes a motor 56 which drives a gear box 58 through a belt 60. The gear box 58 is coupled to a shaft 62 which has a radially adjustable eccentric attached to a crank shaft coupling 64. The index roller 46 is coupled to the crank shaft coupling 64 through a sprocket chain 66 having one end attached to the eccentric and its opposite end attached to a clutch 68. The one-way clutch permits the index roller 46 to be driven only in the clockwise direction. A tension spring 70 is attached to the clutch which draws the sprocket chain 66 backward, thereby resetting the clutch upon each complete revolution of the shaft 62. The exact amount of feeding motion of the rolls 46, 48, therefore, is dependent on the length of the chain 66, which may be adjusted to accommodate a feed increment from about one-half inch to as much as six inches through the index rollers 46, 48. The exact amount of feed delivered by the rolls 46, 48 is dependent upon the length of the chain 66 which extends between the crank shaft coupling 64 to the one-way clutch 68. This length is adjustable by means of a sliding fixture (not shown) mounted on the end of the crank shaft which is preset to the desired length of cut before running the machine. Therefore, the amount of rotation of the index roller 46 is directly controlled by the length of the roller chain 66 actuating the one-way clutch 68.

The knife assembly 54 comprises a fixed shear blade 72 mounted on a supporting frame 74. A reciprocal ram 76 carries a movable knife blade 78 which cuts the superimposed webs in a scissors-like action when driven into engagement with the fixed shear blade 72. The thickness of the severed strips is dependent entirely upon the advance of the index rolls 46, 48. The webs are fed onto a table 80 which can be adjusted in elevation to properly accommodate the severed strips.

When the ram 76 advances from its fully retracted position to its fully extended position, the knife 78 coacts with the knife 72 to sever a two-ply strip from the advanced web increment. At this point, the outermost or right hand surface of the web 14 which has been severed carries stripes of wet adhesive which are pressed against the non-coated surface of the previously severed strips thereby forming an engagement with the entire mass of the unexpanded core stock 12. Because only the exact incremental amount of the superimposed webs are fed to the knife assembly, a take-up mechanism between the knife and the drive rollers is not required.

The sole web driving mechanism in the honeycomb machine 10 is the combination of the index rollers 46, 48. None of the other rollers including the guide rollers and adhesive applicator rollers, are driven. Thus the webs 14, 16 are advanced intermittently through the take-up zone 20 in response to intermittent rotation of the index rollers 46, 48. The guide rollers merely guide the rolls along separate paths through the take-up zone while the index rollers 46, 48 positively engage and grip the webs 14, 16 as they pull the webs through the take-up zone and feed a predetermined incremental portion of the superposed webs into the feed zone 50.

The sudden application of a strong pulling force applied through the webs may cause rupture of the webs if the pulling force exceeds the burst strength of the webs. Although the supply rolls are journaled for free rotation, they may weigh several thousand pounds each and therefore present a considerable inertia load which must be overcome as the webs are advanced. This load may be so substantial that slipping will occur between the webs and the index rollers, thereby causing a variation in the thickness of the strips cut by the knife assembly. Therefore it is essential that a positive gripping action occurs as the index rollers advance the webs into the feed zone without rupturing or bursting one of the webs as the pulling action occurs. Additionally, tension must be maintained in the webs to prevent the occurrence of wrinkling and to prevent backlash as the supply rolls continue to rotate after the pulling force has been interrupted.

These problems are solved in the present invention by the resilient web movement 18 which is interposed between the supply rolls and the feed station 22. The resilient web movement 18 comprises generally a plurality of dancer roller assemblies which engage each web with a yieldable thrusting force for thrusting it out of its plane of advance to maintain the web under tension loading as the web is alternately advanced and halted during the successive feeding and cutting cycles, respectively. Each web is preferably engaged by at least two dancer roller assemblies as can best be seen in FIG. 1. The purpose of the dancer roller assemblies is to gradually relieve the tension as it is suddenly applied in the web in response to the sudden pulling movement of the index rollers 46, 48 while additionally maintaining a tension load in the webs as movement of the webs on the delivery end is arrested and play-out movement of the webs on the supply roll end continues.

According to the preferred embodiment shown in FIG. 1, each web is yieldably engaged by three dancer roller assemblies at three separate stations which are spaced with respect to each other along the direction of web movement. As can be seen in FIG. 1, the dancer roller assemblies are indicated generally by the reference numerals 82, 84, 86 and 88. Web 14 is engaged at stations A, B and C while web 16 is engaged at stations A, B and D.

Figure 2:
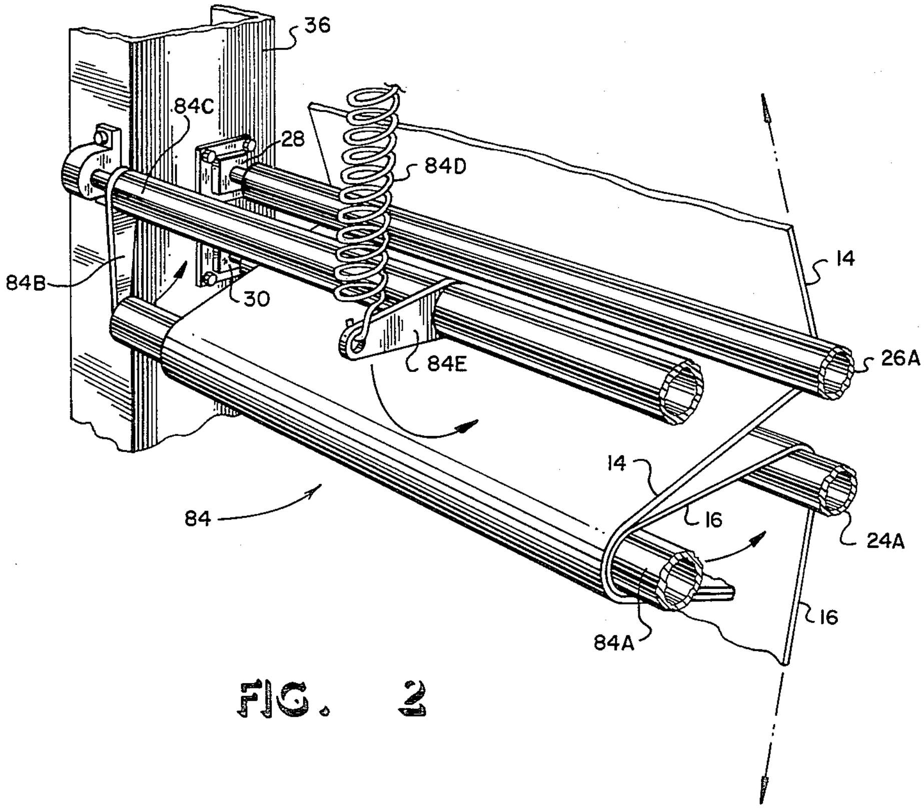
FIG. 2 is a perspective view showing in part a preferred embodiment of a dancer roller assembly; and, FIG. 3 is a side elevation view, partly in section, of the dancer roller assembly shown in FIG. 2.
Figure 3:
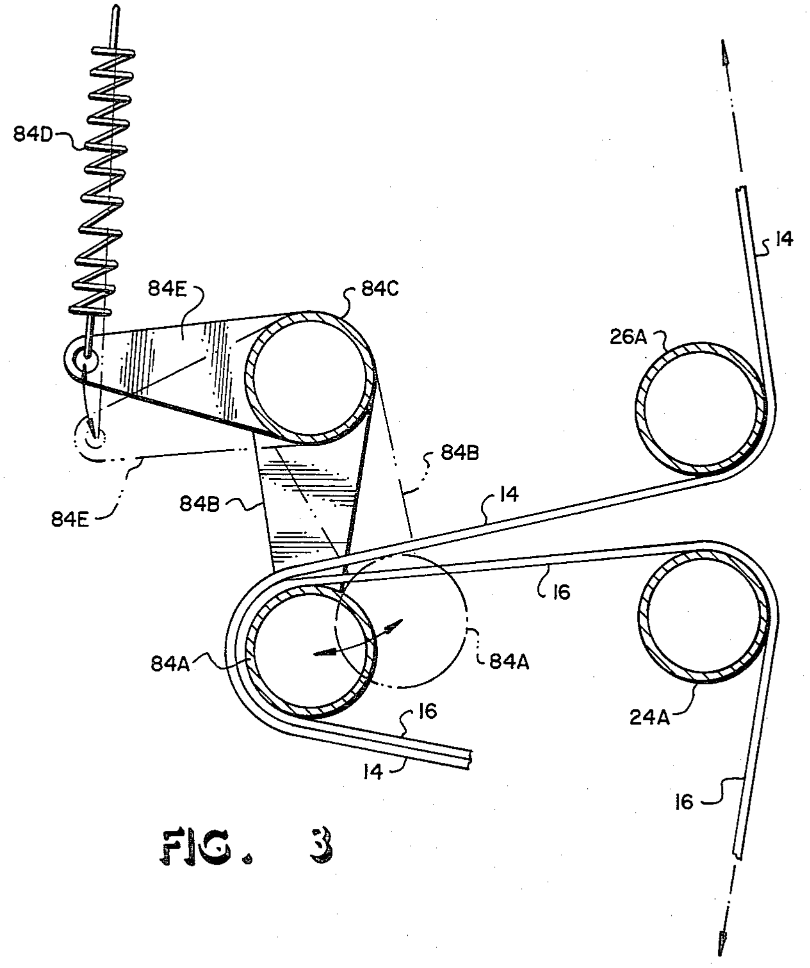

The construction of the dancer roller assembly 84 as shown in FIG. 2 is typical of all of the dancer roller assemblies. The dancer roller assembly 84 includes a roller bar 84A which is rotatably mounted on a yoke 84B which is in turn rigidly secured in spaced relation to a pivot bar 84C. The pivot bar 84C is pivotably mounted to the vertical support column 36 thereby permitting the yoke 84B and roller bar 84A to be displaced in rotary motion about the axis of the pivot bar 84C. The roller bar 84A is biased into yieldable thrusting engagement with the webs 14, 16 by means of a tension spring 84D one end of which is attached to the upper structural beam 34, and the lower end being coupled to a lever 84E which is welded to the pivot bar 84C. The displacement of the roller bar 84 in response to a sudden increase in the pulling force developed by the index rollers 46, 48 is indicated by the dashed lines in FIG. 3. Displacement in the opposite direction occurs when the driving motion of the index rollers 46, 48 is interrupted but the play-out movement of the webs from the supply rolls continues because of the rotational inertia of the supply rolls. Thus the roller bar 84A is displaced in angular reciprocal movement about an average position as the webs are alternately advanced and halted during the successive feeding and cutting cycles, respectively. This reciprocal angular movement is referred to as "dancing", hence the name "dancer roller assembly".

According to the invention in its broadest aspects, the resilient web movement 18 operates to maintain the webs 14, 16 under tension loading as they are alternately advanced and halted during successive feeding and processing cycles, respectively. While doing so, the dancer roller assemblies apply a yieldable thrusting force to the webs in opposition to the pulling force so that the pulling force is not concentrated on a single portion of the web but is distributed at a plurality of points corresponding with the lines of engagement of the dancer roller bars with each web. This distribution of yieldable thrusting forces react the pulling force resiliently at a plurality of spaced locations which permits the index rollers to apply a pulling force strong enough to overcome the inertia load presented by the large mass of the supply rolls without rupturing or tearing the webs.

The smoothing effect provided by the distribution of the yieldable thrusting engagement of the dancer roller assemblies is enhanced by the application of the yieldable thrusting forces on a graduated basis. By "graduated basis" it is meant that the magnitude of the yieldable thrusting force applied at each successive station in the direction of web movement through the take-up zone 20 is less than the magnitude of the thrusting force applied at the preceding station. According to this arrangement, along the path (Stations A–B–C), the spring constant or restoring force associated with the tension spring 82D is greater than the spring constant associated with the next succeeding tension spring 84D which in turn has a greater storing force or spring constant than the next succeeding tension spring 86D. The spring constant or restoring force of the springs 82D, 84D and 88D are similarly related along the lower path (Stations A–B–D) followed by the lower web 16.

In the preferred arrangement shown in FIG. 1, the dancer roller assemblies 82, 84 are commonly engaged by both upper and lower webs 14, 16, respectively, prior to engaging the first guide rollers 24A, 26A. In this arrangement it will be noted that the upper web 14 is in surface engagement with the dancer roller bar 82 in the first dancer roller assembly (Station A) while the lower web 16 engages only the outside surface of the upper web 14 at that station. This relationship is reversed in the next roller bar assembly (Station B) wherein web 16 engages in surface contact with the roller bar 84A and the web 16 rides in surface engagement with the outside surface of the web 14. Because of the difference in the coefficient of friction of the web material relative to the roller bar material, this differential arrangement allows one web to slip slightly with respect to the other to maintain substantially equal tension in both webs. This arrangement is helpful in the event that the supply rolls are of unequal diameter or mass or have unequal bearing loads so that they tend to play out at different rates in response to the same pulling force. This differential tensioning arrangement also removes wrinkles or transverse waves which may be propagated between the supply rolls and the take-up zone.

The graduated yieldable thrusting force arrangement causes a substantially smaller thrusting force to be applied to the webs immediately prior to entering the nip of the index rollers 46, 48 whereby the incremental feeding action is both positive and smooth without slippage of the webs relative to the index rollers.

However, although the graduated, yieldable thrusting arrangement is preferred, especially for applications involving paper stock, uniform thrusting arrangements may be used to good advantage where the primary object is to merely distribute the pulling force at a number of stations through a take-up zone. Furthermore, even in the example given above, the values of acceptable spring constants for the tension springs at each station may vary over a wide range and still produce satisfactory results, depending upon the nature of the web and the rate at which it is fed through the cutting zone.

It should be apparent that the foregoing resiliently stabilized web movement represents an extraordinary departure from the continuous drive movement of conventional machines. The web movement described herein constitutes a resiliently stabilized intermittent web movement and is therefore inherently compatible with the intermittent operation of the cyclical knife cutter in a honeycomb machine. Thus with the web movement of the present invention, the only adjustment required is the core thickness setting of the index rollers to operate in cooperation with the retraction of the knife assembly. This adjustment is relatively insensitive to the problems associated with a continuous drive web movement. Additionally, the resiliently stabilized web movement of the present invention automatically compensates for variations in the advancement of one web relative to the other so that observation and adjustment by an operator is not required, and in fact the preferred dancer assemblies are not adjustable other than the one-time selection and installation of the proper tension spring.

This invention may be embodied in other specific forms without departing from the spirit or essential characteristics thereof. For example, although the tension spring of each dancer assembly is embodied in the form of a helical spring, other resilient means such as leaf springs may be used to good advantage. The present embodiment should therefore be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A method for manufacturing a continuous length of unexpanded honeycomb stock from first and second webs drawn from supply rolls comprising the steps:

guiding the webs in superimposed relation into a take-up zone;

applying tension to the superimposed webs at a first thrusting station by a first common dancer roller assembly which is biased to apply a yieldable thrusting force against the superimposed webs in the direction of unwinding movement of the webs as they are played out from the supply rolls;

applying tension to the superimposed webs at a second thrusting station by a second common dancer roller assembly which is biased to apply a relatively weaker yieldable thrusting force against the superimposed webs in the direction opposite to the direction of unwinding movement of the webs as they are played out from the supply rolls;

dividing the webs at a third station and guiding them along separate paths through the take-up zone;

applying a relatively weaker yieldable thrusting force against each separated web in the take-up zone at fourth and fifth thrusting stations, respectively, by third and fourth separate dancer roller assemblies, respectively, which are biased to apply a yieldable thrusting force against each respective separate web in a direction transverse to the movement of the web as it is engaged by the dancer roller;

applying stripes of adhesive to opposite sides of one of the webs as said web is advanced through the take-up zone;

pulling the webs along their separate paths through the take-up zone and delivering them out of the take-up zone in mutually adhered and laminated condition;

interrupting the pulling force during a cutting cycle following delivery of the laminated webs;

securing the mutually adhered and laminated end of the webs against displacement in response to the thrusting forces applied during the cutting cycle; and, severing strips of predetermined width from the laminated webs and thrusting each severed strip into a pack of previously severed strips.

2. A machine for manufacturing a continuous length of unexpected honeycomb stock from first and second webs drawn intermittently from supply rolls comprising, in combination:

a frame defining a take-up zone;

guide rollers mounted on the frame for directing the webs along separate paths through the take-up zone;

means mounted on the frame in the take-up zone for applying stripes of adhesive to selected surfaces of one of the webs;

a pair of index rollers mounted on the frame for engaging the webs in superimposed relation, pulling them from the supply rolls along their separate paths through the take-up zone, and delivering them in mutually superimposed and laminated condition;

drive control means coupled to the index rollers for alternately starting and stopping rotation of the index rollers during successive feeding and cutting cycles, respectively;

a cyclical strip cutter assembly mounted on the frame for receiving the laminated webs, severing strips of predetermined width from the laminated webs and thrusting each severed strip into a pack of previously severed strips; and, a web movement mounted on the frame for applying a yieldable thrusting force to each web in a direction transverse to the direction of web travel at a plurality of thrusting stations in the take-up zone, the magnitude of the thrusting force applied at each successive station in the direction of web travel along its separate path being less than the magnitude of the thrusting force applied at the preceding station.

3. The honeycomb machine as defined in claim 2, said web movement comprising a plurality of dancer rollers mounted on the frame for engaging each web at the thrusting stations along each separate path in the take-up zone, each dancer roller being mounted for movement transverse to the direction of web movement at the line of engagement of each dancer roller and web, and resilient means coupled intermediate the frame and each dancer roller for biasing each dancer roller into thrusting engagement with its respective web and maintaining said web under tension as they are alternately advanced and halted during the successive feeding and processing cycles, respectively.

* * * * *

UNITED STATES PATENT AND TRADEMARK OFFICE

CERTIFICATE OF CORRECTION

PATENT NO. : 4,229,243

DATED : Oct. 21, 1980

INVENTOR(S) : Daniel H. Ellinor

It is certified that error appears in the above—identified patent and that said Letters Patent is hereby corrected as shown below:

ABSTRACT, Line 17, "stoped" should be "stopped";

Column 2, Line 2, "umiform" should be "uniform"; and

Column 11, line 7, "unexpected" should be -- unexpanded --.

Signed and Sealed this

*Third* Day of *March 1981*

[SEAL]

*Attest:*

RENE D. TEGTMEYER

*Attesting Officer* *Acting Commissioner of Patents and Trademarks*